United States Patent
Poluri et al.

(10) Patent No.: US 11,086,664 B2
(45) Date of Patent: Aug. 10, 2021

(54) VALIDATING A TASK BEING PERFORMED ON AN HVAC SYSTEM

(71) Applicant: Honeywell International Inc., Morris Plains, NJ (US)

(72) Inventors: Nagasree Poluri, Bangalore (IN); Seema P, Bokaro Steel (IN)

(73) Assignee: Honeywell International Inc., Charlotte, NC (US)

(*) Notice: Subject to any disclaimer, the term of this patent is extended or adjusted under 35 U.S.C. 154(b) by 22 days.

(21) Appl. No.: 16/166,742

(22) Filed: Oct. 22, 2018

(65) Prior Publication Data
US 2020/0125401 A1  Apr. 23, 2020

(51) Int. Cl.
*G05B 15/02* (2006.01)
*F24F 11/30* (2018.01)
*G06F 9/48* (2006.01)

(52) U.S. Cl.
CPC ............ *G06F 9/4881* (2013.01); *F24F 11/30* (2018.01); *G05B 15/02* (2013.01)

(58) Field of Classification Search
CPC ......... F24F 11/30; G05B 15/02; G06F 9/4881
See application file for complete search history.

(56) References Cited

U.S. PATENT DOCUMENTS

| | | | | |
|---|---|---|---|---|
| 2016/0123620 A1* | 5/2016 | Orsini | ................... | G05B 15/02 700/276 |
| 2018/0121662 A1* | 5/2018 | Pelton | ..................... | G06F 21/64 |
| 2018/0328612 A1* | 11/2018 | Sinha | ...................... | F24F 11/30 |
| 2019/0065685 A1* | 2/2019 | Pickover | .............. | H04L 9/3297 |
| 2019/0340269 A1* | 11/2019 | Biernat | ................. | G06F 16/248 |
| 2019/0349426 A1* | 11/2019 | Smith | ..................... | H04W 4/08 |
| 2019/0356164 A1* | 11/2019 | Ghaemi | ............. | H02J 13/0006 |
| 2020/0005404 A1* | 1/2020 | Patterson | ............... | G06Q 20/10 |

* cited by examiner

*Primary Examiner* — Michael J Huntley
(74) *Attorney, Agent, or Firm* — Brooks, Cameron & Huebsch, PLLC

(57) ABSTRACT

Validating a task being performed on an HVAC system is described herein. One system includes a plurality of control devices associated with a heating, ventilation, and air conditioning (HVAC) system, wherein each respective control device is configured to record an action, taken by that control device as part of a task being performed on the HVAC system, as a block in a block chain for the task, send the block to the other control devices for validation of the action in the block chain for the task, update, upon the validation of the recorded action, the block chain for the task with the block having the recorded action, and store the updated block chain for the task.

16 Claims, 3 Drawing Sheets

VALIDATING A TASK BEING PERFORMED ON AN HVAC SYSTEM

TECHNICAL FIELD

The present disclosure relates generally to systems, methods, and devices for validating a task being performed on an HVAC system.

BACKGROUND

A heating, ventilation, and air conditioning (HVAC) system can be used to control the environment within a facility (e.g., building). For example, an HVAC system can include a number of components (e.g., equipment, sensors, operating panels, controllers, actuators, etc.) that can be used to control the air temperature of different zones (e.g., rooms, areas, spaces, and/or floors) of a facility, in order to keep the zones in a comfort state for their occupants.

Various tasks (e.g., jobs) may be need performed on an HVAC system (e.g., on the components of the HVAC system) during both the setup (e.g., installation) and operation of the HVAC system. For example, the setup of an HVAC system may involve a number of engineering, commissioning, and/or configuration tasks, and the operation of an HVAC system may involve a number of maintenance and/or repair tasks.

Such tasks, however, can be complex, involving many different actions (e.g., steps) taken by many different actors. Accordingly, a lack of coordination between the actors during such a task can result in actions not being taken (e.g. being skipped and/or missed), actions not being fully completed (e.g., being incomplete or only partially completed), actions being performed incorrectly and/or out of order, and/or actions being duplicated (e.g., repeated by multiple actors) during the performance of the task.

Previous approaches, however, may lack the coordination needed between the actors to validate the actions of the tasks as they are performed, and as such may not be capable of detecting and correcting such errors in the actions until late in the process of performing the task, or even until after the task has been completed (e.g., during subsequent operation of the HVAC system), at which point a significant amount of rework is needed to correct the errors and complete the performance of the task correctly. Accordingly, such previous approaches may result in an increased cost and/or increased amount of time needed to complete the performance of the task correctly, and/or may result in an increased amount of maintenance and/or repair issues arising during operation of the HVAC system.

DETAILED DESCRIPTION

Figure 1:
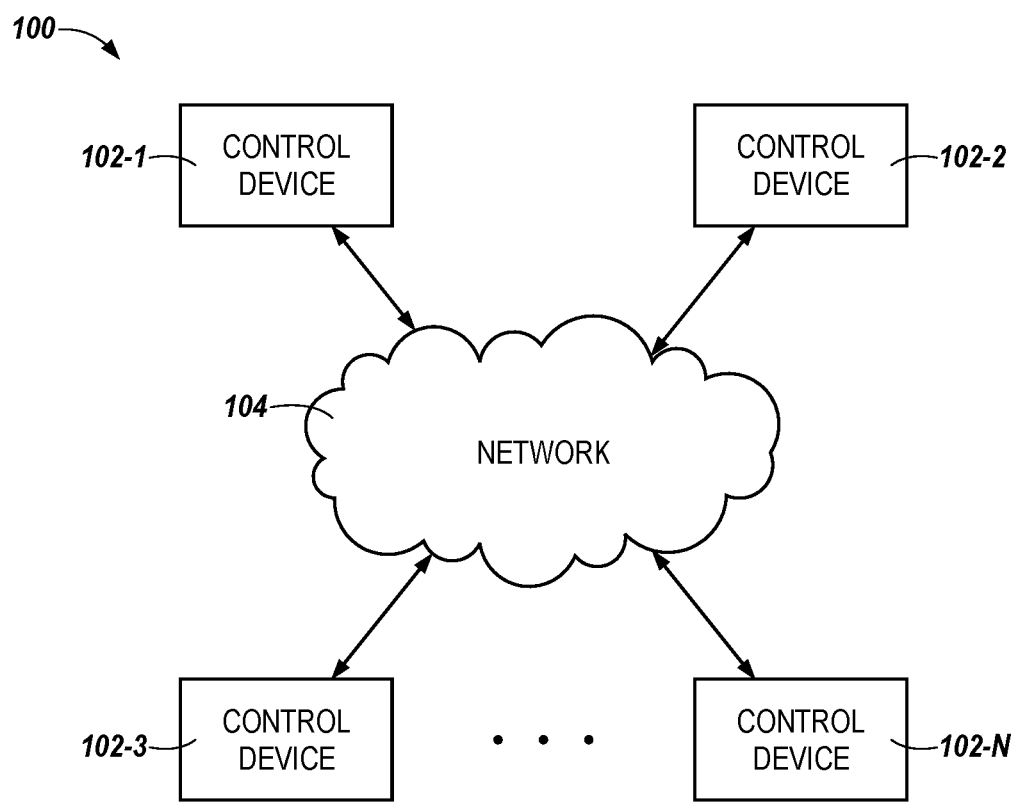
FIG. 1 illustrates an example of a system for validating a task being performed on an HVAC system in accordance with an embodiment of the present disclosure.

Systems, methods, and devices for validating a task being performed on an HVAC system are described herein. For example, an embodiment includes a plurality of control devices associated with a heating, ventilation, and air conditioning (HVAC) system, wherein each respective control device is configured to record an action, taken by that control device as part of a task being performed on the HVAC system, as a block in a block chain for the task, send the block to the other control devices for validation of the action in the block chain for the task, update, upon the validation of the recorded action, the block chain for the task with the block having the recorded action, and store the updated block chain for the task.

Embodiments of the present disclosure can allow for coordination between actors performing a task (e.g. job) on an HVAC system (e.g., on components of the HVAC system), in order to validate actions (e.g., steps) of the tasks taken by the actors as they are performed. As such, embodiments of the present disclosure may be capable of detecting and correcting errors in the actions, such as, for instance, actions not being taken (e.g. being skipped and/or missed), actions not being fully completed (e.g., being incomplete or only partially completed), and/or actions being performed incorrectly and/or out of order, quickly (e.g., as they occur) during the performance of the task, before a significant amount of rework and/or last minute changes would be needed to correct the errors and complete the performance of the task correctly. Further, embodiments of the present disclosure may be capable of preventing actions being duplicated (e.g., repeated by multiple actors) during the performance of the task.

Accordingly, embodiments of the present disclosure may reduce the cost and/or amount of time needed to complete the performance of the task correctly, and/or may reduce the amount of maintenance and/or repair issues that arise during operation of the HVAC system, as compared with previous approaches that lack such coordination and validation. Further, embodiments of the present disclosure may provide a greater confidence (e.g., integrity and/or trust) that the task has been performed correctly, and/or make it easier to guide and/or train new users who are performing the task, than previous approaches that lack such coordination and validation.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a", "an", or "a number of" something can refer to one or more such things, while "a plurality of" something can refer to more than one such things. For example, "a number of devices" can refer to one or more devices, while "a plurality of devices" can refer to more than one device. Additionally, the designator "N" as used herein, particularly with respect to reference numerals in the drawings, indicates that a number of the particular feature so designated can be included with a number of embodiments of the present disclosure.

FIG. 1 illustrates an example of a system 100 for validating a task being performed on an HVAC system in accordance with an embodiment of the present disclosure. The HVAC system can be, for example, the HVAC system of a facility (e.g., building), such as, for instance, a commercial office building. However, embodiments of the present disclosure are not limited to a particular type of facility.

The HVAC system can be used to control the environment within the facility. For example, the HVAC system can include a number of components that can be used to control the air temperature of different zones (e.g., rooms, areas, spaces, and/or floors) of a facility, in order to keep the zones in a comfort state for their occupants. The components of the HVAC system can include, for example, objects, control devices (e.g., controllers), equipment, devices, networks, sensors, and/or actuators such as, for instance, valves such as heating and/or cooling valves, chillers (e.g., chiller plant), boilers (e.g., boiler plant), pumps such as hot water and/or chilled water pumps, fans, compressors, air dampers such as variable air volume (VAV) dampers, air handling units (AHUs) (e.g., AHU plant), coils such as heating and/or cooling coils, air filters, and/or cooling towers, among other components. The HVAC system may also include connections (e.g., physical connections) between the components, such as a chain of equipment (e.g., duct work, pipes, ventilation, and/or electrical and/or gas distribution equipment) that connects the components, among other connections.

As shown in FIG. 1, system 100 can include a plurality of control devices 102-1, 102-2, 102-3, . . . , 102-N that are associated with the HVAC system. Control devices 102-1, 102-2, 102-3, . . . , 102-N can be, for instance, devices used to control (e.g., manage, monitor, and/or adjust) the HVAC system (e.g., the components and/or settings of the HVAC system) during the setup (e.g., installation) and/or operation of the HVAC system. For example, control devices 102-1, 102-2, 102-3, . . . , 102-N can be devices used by various actors (e.g., users) to perform various actions (e.g. steps) of tasks (e.g., jobs) being performed on the HVAC system during the setup and/or operation of the HVAC system.

As examples, control devices 102-1, 102-2, 102-3, . . . , 102-N can include a controller (e.g., a thermostat) of the HVAC system, an input/output (I/O) device (e.g., module), a computing device of an engineer (e.g., a hardware, software, project, or graphic engineer) of the HVAC system performing engineering, commissioning, and/or configuration tasks during the setup of the HVAC system, a computing device of a manager (e.g., a facility manager) of the HVAC system, a computing device of a technician (e.g., a commissioning technician) of the HVAC system performing commissioning tasks during the setup of the HVAC system, and/or a computing device of a technician (e.g., a maintenance or repair technician) performing maintenance or repair tasks on the HVAC system, among other examples. Further, each of control devices 102-1, 102-2, 102-3, . . . , 102-N can include a memory, a processor, and a user interface, as will be further described herein (e.g., in connection with FIG. 4).

As shown in FIG. 1, control devices 102-1, 102-2, 102-3, . . . , 102-N can communicate with each other via network 104. Network 104 can be a wired or wireless network. For example, network 104 can be a network relationship through which control devices 102-1, 102-2, 102-3, . . . , 102-N can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to, control devices 102-1, 102-2, 102-3, . . . , 102-N via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Control devices 102-1, 102-2, 102-3, . . . , 102-N can each comprise (e.g., act as) a different node in a block chain to validate actions taken during the performance of a task on the HVAC system. For example, during the performance of a task (e.g., job) on the HVAC system, such as, for instance, an engineering, commissioning, or configuration task performed during the setup of the HVAC system, or a maintenance or repair task performed during the operation of the HVAC system, as previously described herein, a (e.g., each respective) control device 102-1, 102-2, 102-3, . . . , 102-N can record (e.g., store) an action (e.g., step), taken by that control device (e.g. by the user of that control device) as part of the task, as a block (e.g., transaction) in a block chain for the task. The block can include data (e.g. configuration data) associated with the recorded action of the block, a hashed timestamp for the recorded action of the block indicating the time the action was taken, and link (e.g., with a root block hash) to the previous block in the block chain for the task.

The block chain for the task can include a number of additional blocks, each including an action that has been previously taken as part of the task and been previously validated in the block chain for the task. That is, the block chain can comprise a growing list of records of actions that have been taken and validated during the performance of the task, with each block in the chain including data associated with the recorded action of that block, a hashed timestamp for the recorded action of that block indicating the time the action was taken, and link to the previous block in the block chain, with the presently added block comprising the newest block in the chain. This block chain can be included in (e.g., stored by) each respective control device 102-1, 102-2, 102-3, . . . , 102-N.

The control device 102-1, 102-2, 102-3, . . . , 102-N that records the action as the block in the block chain can then send (e.g., transmit), via network 104, the block to the other control devices 102-1, 102-2, 102-3, . . . , 102-N for validation of the action in the block chain for the task. Upon receiving the block, the other control devices 102-1, 102-2, 102-3, . . . , 102-N can validate (e.g., determine whether to validate) the recorded action of the block. This validation (e.g., the determination of whether to validate) can be made immediately (e.g., instantly) by the other control devices 102-1, 102-2, 102-3, . . . , 102-N upon receipt of the block, before the next action of the task is performed.

The validation of (e.g., determination of whether to validate) the recorded action of the block by each respective one of the other control devices 102-1, 102-2, 102-3, . . . , 102-N can be made based on (e.g., by considering), for instance, data (e.g. parameters, current and/or previous operating data points, etc.) of that control device, and/or historical data of the block chain (e.g., data from the previous blocks in the chain) for the task. As an example, the user of that control device (e.g., engineer, manager, or technician) can make the determination to validate the recorded action of the block, and provide instructions (e.g., input) to the control device to validate the action. The control device can then validate the recorded action responsive to receiving the instructions. As an additional example, the control device can autonomously (e.g., without user input) make the determination of whether to validate the recorded action of the block, and then validate the recorded action responsive to making the determination to validate the action.

In an embodiment, the recorded action of the block may be considered validated upon the majority of the other control devices 102-1, 102-2, 102-3, . . . , 102-N validating the action (e.g., not all of the other control devices may need to validate the action for it to be considered validated). Upon the recorded action of the block being validated, the block chain for the task can be updated with (e.g., to include) the block having the recorded action. For example, the block having the recorded action can be added to the block chain for the task (e.g., as the next block in the chain). The updated block chain for the task can then be stored by each respective control device 102-1, 102-2, 102-3, . . . , 102-N.

As an example of a validation in accordance with the present disclosure, during a commissioning task a commissioning technician may take the action of submitting, via his or her computing device, a checkout report indicating that he or she has completed a point/wiring checkout of a controller of the HVAC system on a particular day and time. In such an example, the controller can validate, as a node in the block chain, whether there was a read/write request on its present value and offsets of the points of the controller on that day and time by the commissioning technician. Further, a facility manager can validate, via his or her computing device, whether the technician is at the facility that day and has been assigned to commission that controller on that day. Further, a hardware engineer can validate, via his or her computing device, whether the I/O terminal and wiring has been defined for the points of the controller and the controller is ready for commissioning.

After the validation of the recorded action of the block has occurred, the next (e.g., subsequent) action taken by one of the control devices 102-1, 102-2, 102-3, . . . , 102-N as part of the task being performed on the HVAC system can be recorded by that control device as an additional (e.g., the next) block and the block chain for the task, in a manner analogous to that for the previous action. That control device can then send the additional block to the other control devices 102-1, 102-2, 102-3, . . . , 102-N for validation of that subsequent action, in a manner analogous to that for the previous action.

Subsequent actions of the task can continue to be taken and validated in such a manner, until all actions of the task have been taken and validated. Upon completion of the task, a report of the completion of the task can be automatically generated and sent, via network 104, to control devices 102-1, 102-2, 102-3, . . . , 102-N.

Figure 2:
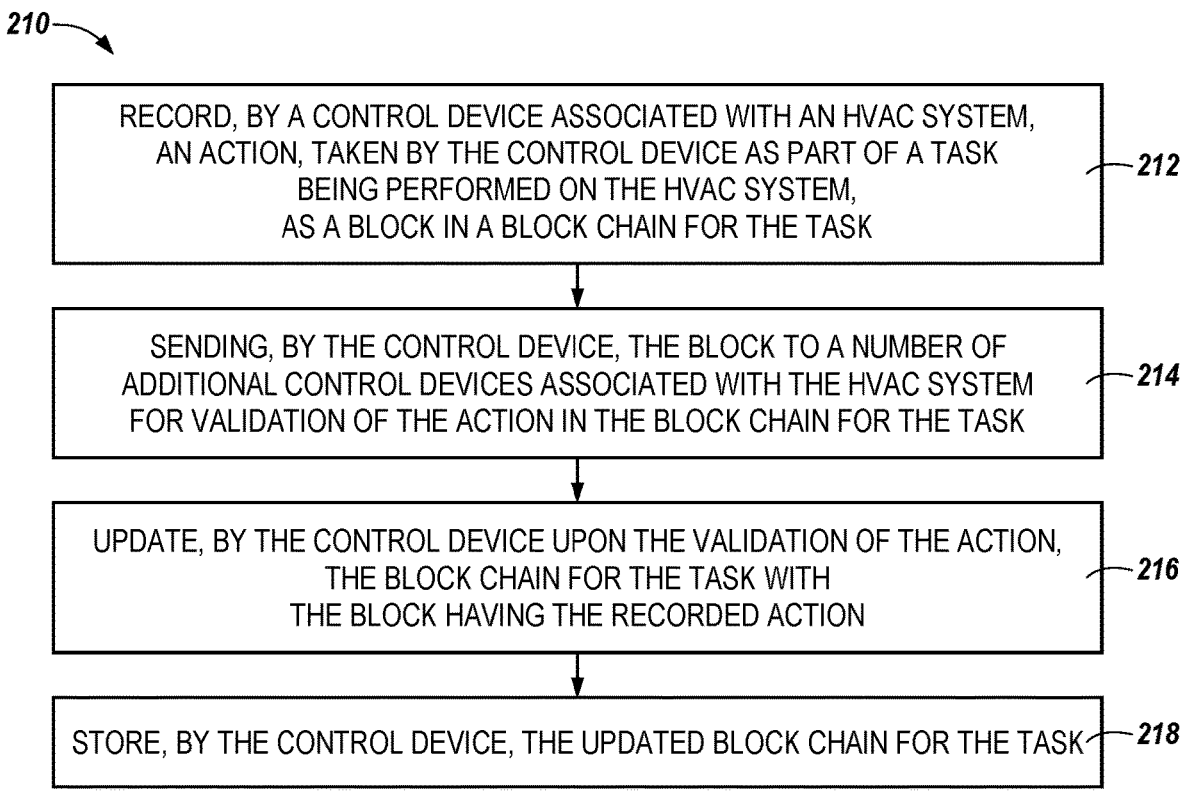
FIG. 2 illustrates an example of a method for validating a task being performed on an HVAC system in accordance with an embodiment of the present disclosure.

FIG. 2 illustrates an example of a method 210 for validating a task being performed on an HVAC system in accordance with an embodiment of the present disclosure. The task can be, for example, an engineering, commissioning, or configuration task performed during the setup of the HVAC system, or a maintenance or repair task performed during the operation of the HVAC system, as previously described herein (e.g., in connection with FIG. 1).

At block 212, method 210 includes recording, by a control device associated with the HVAC system, an action, taken by the control device as part of the task, as a block in a block chain for the task. The control device can be, for example, one of control devices 102-1, 102-2, 102-3, . . . , 102-N previously described in connection with FIG. 1, and the action can be recorded as the block in the block chain for the task in a manner analogous to that previously described in connection with FIG. 1.

At block 214, method 210 includes sending, by the control device, the block to a number of additional control devices associated with the HVAC system for validation of the action in the block chain for the task. The additional control devices can be, for example, the other control devices 102-1, 102-2, 102-3, . . . , 102-N previously described in connection with FIG. 1, and the block can be sent to the additional control devices in a manner analogous to that previously described in connection with FIG. 1. Further, the action can be validated in a manner analogous to that previously described in connection with FIG. 1.

At block 216, method 210 includes updating, by the control device upon the validation of the action, the block chain for the task with the block having the recorded action. The block chain can be updated with the block, for example, in a manner analogous to that previously described in connection with FIG. 1. At block 218, method 210 includes storing, by the control device, the updated block chain for the task.

Figure 3:
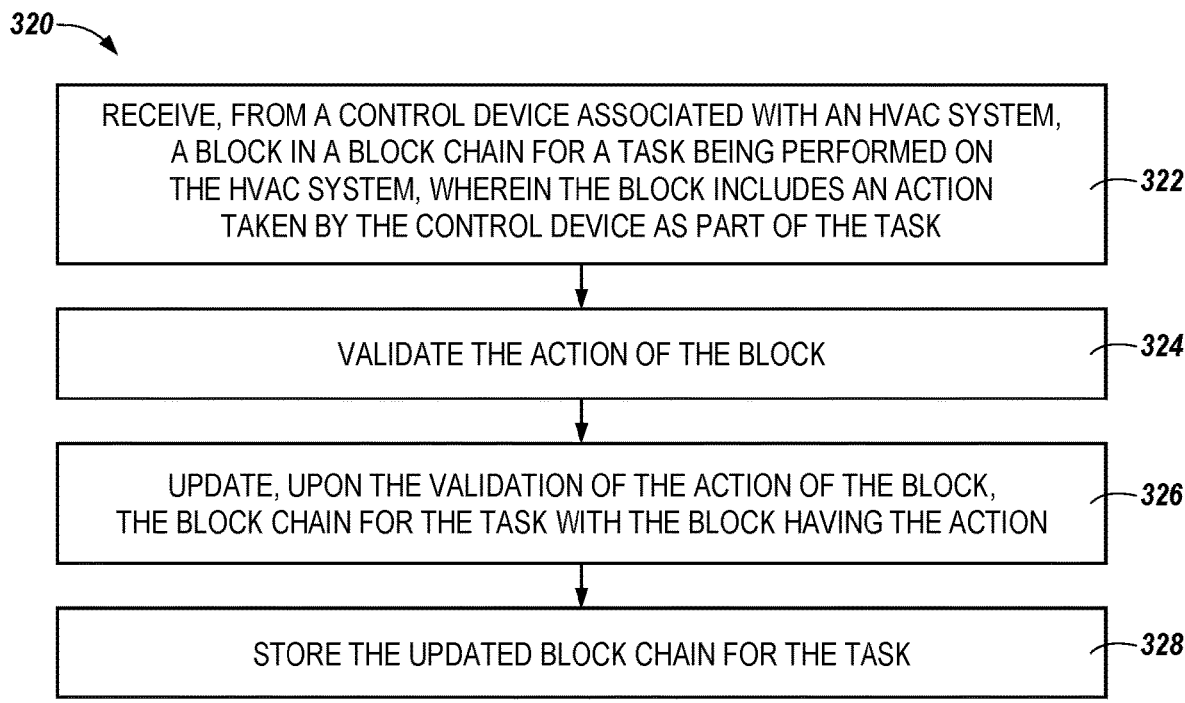
FIG. 3 illustrates an example of a method for validating a task being performed on an HVAC system in accordance with an embodiment of the present disclosure.

FIG. 3 illustrates an example of a method 320 for validating a task being performed on an HVAC system in accordance with an embodiment of the present disclosure. The task can be, for example, an engineering, commissioning, or configuration task performed during the setup of the HVAC system, or a maintenance or repair task performed during the operation of the HVAC system, as previously described herein (e.g., in connection with FIG. 1).

At block 322, method 320 includes receiving, from a control device associated with the HVAC system, a block in a block chain for the task, wherein the block includes an action taken by the control device as part of the task. The control device can be, for example, one of control devices 102-1, 102-2, 102-3, . . . , 102-N previously described in connection with FIG. 1, and the action can be recorded in the block in the block chain for the task by that control device in a manner analogous to that previously described in connection with FIG. 1. Further, the block can be received from that control device by the other control devices 102-1, 102-2, 102-3, . . . , 102-N, in a manner analogous to that previously described in connection with FIG. 1.

At block 324, method 320 includes validating the action of the block. The action can be validated, for instance, by the other control devices 102-1, 102-2, 102-3, . . . , 102-N that have received the block, in a manner analogous to that previously described in connection with FIG. 1.

At block 326, method 320 includes updating, upon the validation of the action of the block, the block chain for the task with the block having the action. The block chain can be updated with the block, for example, in a manner analogous to that previously described in connection with FIG. 1.

At block 328, method 320 includes storing the updated block chain for the task. The updated block chain can be stored, for example, by each respective control device 102-1, 102-2, 102-3, . . . , 102-N, in a manner analogous to that previously described in connection with FIG. 1.

Figure 4:
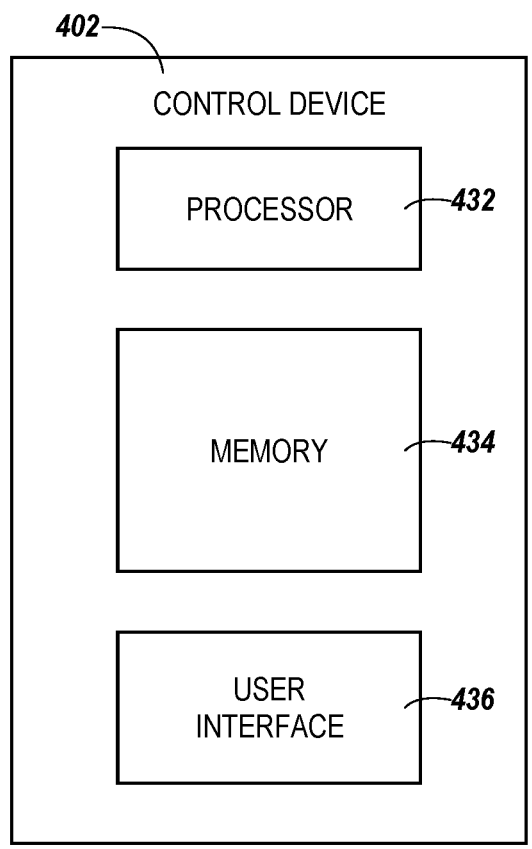
FIG. 4 illustrates an example of a control device for validating a task being performed on an HVAC system in accordance with an embodiment of the present disclosure.

FIG. 4 illustrates an example of a control device 402 for validating a task being performed on an HVAC system in accordance with an embodiment of the present disclosure. Control device 402 can be an example of control devices 102-1, 102-2, 102-3, . . . , 102-N previously described in connection with FIG. 1. For example, control device 402 can be a controller, I/O device, or computing device used to control the HVAC system during the setup and/or operation of the HVAC system, as previously described in connection with FIG. 1.

A computing device, as used herein, can be, refer to, and/or include a laptop computer, desktop computer, or mobile device, such as, for instance, a smart phone or tablet, among other types of computing devices. However, embodiments of the present disclosure are not limited to a particular type of computing device. Further, a mobile device (e.g., smart phone or tablet) in accordance with the present disclosure may include a mobile app for validating a task being performed on an HVAC system in accordance with the present disclosure. As used herein, a mobile app may include and/or refer to computer readable and/or executable instructions (e.g., a computer program) designed to run on a mobile device (e.g., a smart phone or tablet). For instance, a mobile app may be run on control device 402 to validate a task being performed on an HVAC system in accordance with the present disclosure.

As shown in FIG. 4, control device 402 can include a processor 432 and a memory 434. Memory 434 can be any type of storage medium that can be accessed by processor 432 to perform various examples of the present disclosure. For example, memory 434 can be a non-transitory computer readable medium having computer readable instructions (e.g., computer program instructions) stored thereon that are executable by processor 434 to validate a task being performed on an HVAC system in accordance with the present disclosure. That is, processor 432 can execute the executable instructions stored in memory 434 to validate a task being performed on an HVAC system in accordance with the present disclosure.

Memory 434 can be volatile or nonvolatile memory. Memory 434 can also be removable (e.g., portable) memory, or non-removable (e.g., internal) memory. For example, memory 434 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 434 is illustrated as being located in control device 402, embodiments of the present disclosure are not so limited. For example, memory 434 can also be located internal to another computing resource (e.g., enabling computer readable instructions to be downloaded over the Internet or another wired or wireless connection).

As shown in FIG. 4, control device 402 can include a user interface 436. A user (e.g., operator) of control device 402, such as, for instance, the example users previously described in connection with FIG. 1, can interact with control device 402 via user interface 436. For example, user interface 436 can provide (e.g., display) information to and/or receive information from (e.g., input by) the user of control device 402.

In some embodiments, user interface 436 can be a graphical user interface (GUI) that can include a display (e.g., a screen) that can provide information to, and/or receive information from, the user of control device 402. The display can be, for instance, a touch-screen (e.g., the GUI can include touch-screen capabilities). As an additional example, user interface 436 can include a keyboard and/or mouse the user can use to input information into control device 402, and/or a speaker that can play audio to, and/or receive audio (e.g., voice input) from, the user. Embodiments of the present disclosure, however, are not limited to a particular type(s) of user interface.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for validating a task being performed on a heating, ventilation, and air conditioning (HVAC) system, comprising:
   a plurality of control devices associated with an HVAC system, wherein each respective control device is configured to:
   record an action, taken by that control device as part of a setup task being performed on the HVAC system during a setup of the HVAC system, as a block in a block chain for the setup task;
   send the block to the other control devices for validation of the action in the block chain for the setup task;

validate, upon receiving a block in the block chain for the setup task, the recorded action of the block based, at least in part, on an operating data point of that respective control device corresponding to the action upon the action being taken;

update, upon the validation of the recorded action, the block chain for the setup task with the block having the recorded action;

store the updated block chain for the setup task;

generate, upon validation of all actions of the setup task, a report that the setup task has been completed; and send the report that the setup task has been completed to the other control devices.

2. The system of claim 1, wherein each respective control device comprises a different node of the block chain for the setup task.

3. The system of claim 1, wherein the block includes data associated with the recorded action of the block.

4. The system of claim 1, wherein the block includes a timestamp for the recorded action of the block.

5. The system of claim 1, wherein the block includes a link to a previous block in the block chain for the setup task.

6. The system of claim 1, wherein the plurality of control devices associated with the HVAC system include:
a controller of the HVAC system;
a computing device of an engineer of the HVAC system;
a computing device of a manager of the HVAC system; and
a computing device of a technician of the HVAC system.

7. A method for validating a task being performed on a heating, ventilation, and air conditioning (HVAC) system, comprising:
recording, by a control device associated with an HVAC system, an action, taken by the control device as part of a maintenance task being performed on the HVAC system during maintenance of the HVAC system, as a block in a block chain for the maintenance task;
sending, by the control device, the block to a number of additional control devices associated with the HVAC system for validation of the action in the block chain for the maintenance task;
validating, by each of the number of additional control devices upon receiving the block in the block chain for the maintenance task, the recorded action of the block based, at least in part, on an operating data point of that respective additional control device corresponding to the action upon the action being taken;
updating, by the control device upon the validation of the action, the block chain for the maintenance task with the block having the recorded action;
storing, by the control device, the updated block chain for the maintenance task;
generating, by the control device upon validation of all actions of the maintenance task, a report that the maintenance task has been completed; and
sending, by the control device, the report that the maintenance task has been completed to the additional control devices.

8. The method of claim 7, wherein the method includes, after the validation of the action by the number of additional control devices:
recording, by the control device, an additional action, taken by the control device as part of the maintenance task being performed on the HVAC system, as an additional block in the block chain for the maintenance task; and
sending, by the control device, the additional block to the number of additional control devices for validation of the additional action in the block chain for the maintenance task.

9. The method of claim 7, wherein the block chain for the maintenance task includes a number of additional blocks, wherein each respective additional block includes an action that has been previously taken as part of the maintenance task and previously validated in the block chain for the maintenance task.

10. The method of claim 7, wherein the method includes sending the block to the number of additional control devices via a network.

11. A non-transitory computer readable medium having computer readable instructions stored thereon that are executable by a processor to:
receive, by a control device associated with a heating, ventilation, and air conditioning (HVAC) system from an additional control device of the HVAC system, a block in a block chain for a repair task being performed on the HVAC system during a repair of the HVAC system, wherein the block includes an action taken by the additional control device as part of the repair task;
validate the action of the block based, at least in part, on an operating data point of the control device corresponding to the action upon the action being taken;
update, upon the validation of the action of the block, the block chain for the repair task with the block having the action;
store the updated block chain for the repair task;
generate, upon validation of all actions of the repair task, a report that the repair task has been completed; and
send the report that the repair task has been completed to the additional control device.

12. The computer readable medium of claim 11, wherein the instructions are executable by the processor to:
receive instructions from a user to validate the action of the block; and
validate the action of the block responsive to receiving the instructions.

13. The computer readable medium of claim 11, wherein the instructions are executable by the processor to:
determine whether to validate the action of the block; and
validate the action of the block responsive to determining to validate the action of the block.

14. The computer readable medium of claim 11, wherein the instructions are executable by the processor to validate the action of the block based, at least in part, on historical data of the block chain for the repair task.

15. The computer readable medium of claim 11, wherein the instructions are executable by the processor to update the block chain for the repair task with the block having the action by adding the block having the action to the block chain for the repair task.

16. The computer readable medium of claim 11, wherein the instructions are executable by the processor to immediately validate the action of the block upon receiving the block.

* * * * *